United States Patent
Won et al.

(10) Patent No.: US 10,515,563 B2
(45) Date of Patent: Dec. 24, 2019

(54) APPARATUS AND METHOD FOR PROVIDING REALISTIC EDUCATION MEDIA

(71) Applicant: NAVIWORKS CO., LTD., Anyang-si, Gyeonggi-do (KR)

(72) Inventors: Jun Hee Won, Seoul (KR); Jae Uk An, Yongin-si (KR); Min Ju Song, Seoul (KR)

(73) Assignee: NAVIWORKS CO., LTD., Anyang-si, Gyeonggi-Do (KR)

( * ) Notice: Subject to any disclaimer, the term of this patent is extended or adjusted under 35 U.S.C. 154(b) by 407 days.

(21) Appl. No.: 15/441,238

(22) Filed: Feb. 24, 2017

(65) Prior Publication Data
US 2017/0243503 A1    Aug. 24, 2017

(30) Foreign Application Priority Data
Feb. 24, 2016   (KR) .................... 10-2016-0021861

(51) Int. Cl.
| G09B 9/00 | (2006.01) |
| G09B 23/28 | (2006.01) |
| G09B 5/06 | (2006.01) |
| A63B 24/00 | (2006.01) |
| G09B 5/08 | (2006.01) |
| G09B 19/00 | (2006.01) |
| G09B 19/16 | (2006.01) |

(52) U.S. Cl.
CPC ............ *G09B 9/00* (2013.01); *A63B 24/0075* (2013.01); *G09B 5/06* (2013.01); *G09B 5/065* (2013.01); *G09B 5/08* (2013.01); *G09B 19/00* (2013.01); *G09B 19/0038* (2013.01); *G09B 19/165* (2013.01); *G09B 23/28* (2013.01); *A63B 2024/0012* (2013.01); *A63B 2024/0081* (2013.01)

(58) Field of Classification Search
None
See application file for complete search history.

(56) References Cited

U.S. PATENT DOCUMENTS

| 5,984,684 A * | 11/1999 | Brostedt ............ A63B 24/0003 434/247 |
| 2002/0164567 A1* | 11/2002 | Katayama .......... A63B 24/0003 434/252 |

(Continued)

FOREIGN PATENT DOCUMENTS

| KR | 10-2005-0013461 A | 2/2005 |
| KR | 10-2011-0065388 A | 6/2011 |
| KR | 10-2014-0077029 A | 6/2014 |

OTHER PUBLICATIONS

GolfswingHD, Henrik Stenson—Golf Swing Footage 2014 Multiple Angles Full Speed & Slow Motion, Jul. 21, 2014, https://www.youtube.com/watch?v=4XTdsv5Al28.*

(Continued)

*Primary Examiner* — Jason T Yen
(74) *Attorney, Agent, or Firm* — Hauptman Ham, LLP

(57) ABSTRACT

Disclosed are an apparatus and a method for providing realistic education media which enable the most realistic education on not only an image and a sound but also even the minute motion of an expert who is proficient in a high level of technique when the technique is performed by the expert.

12 Claims, 4 Drawing Sheets

(56) References Cited

U.S. PATENT DOCUMENTS

| | | | | |
|---|---|---|---|---|
| 2006/0003300 A1* | 1/2006 | Davis | ................ | A63B 24/0003 |
| | | | | 434/247 |
| 2010/0034519 A1* | 2/2010 | Kato | ....................... | H04N 5/85 |
| | | | | 386/248 |
| 2012/0151344 A1* | 6/2012 | Humphrey | ............. | G09B 5/065 |
| | | | | 715/716 |
| 2014/0280219 A1* | 9/2014 | Maser | .................. | G11B 27/031 |
| | | | | 707/748 |
| 2015/0139502 A1* | 5/2015 | Holohan | ............ | G06K 9/00342 |
| | | | | 382/107 |
| 2015/0356780 A1* | 12/2015 | Madegowda | ............ | G09B 5/14 |
| | | | | 345/633 |
| 2018/0295419 A1* | 10/2018 | Thielen | .................. | G09B 5/065 |

OTHER PUBLICATIONS

Korean Office Action dated Nov. 28, 2017, in connection with the counterpart Korean Patent Application No. 10-2016-0021861.

\* cited by examiner

APPARATUS AND METHOD FOR PROVIDING REALISTIC EDUCATION MEDIA

This application is based upon and claims the benefit of priority from Korean Patent Application No. 10-2016-0021861, filed on Feb. 24, 2016, the entire contents of which are incorporated herein by reference.

BACKGROUND OF THE DISCLOSURE

1. Field of the Disclosure

The present disclosure relates to a field of education on a technique and, more particularly, to a method which enables the most realistic education on not only an image and a sound but also even the minute motion of an expert who is proficient in a high level of technique when the technique is performed by the expert.

2. Description of the Prior Art

Practitioners in fields which need continuous and repeated practice with the intention of acquiring a high level of technique, such as a soldier who handles a dangerous weapon such as a missile or a gun, a doctor who should perform various difficult surgeries, an airplane pilot who controls safety by a minute manipulation, an athlete whose acquisition of knowhow significantly affects a result, and the like, are continuously educated by experts who are already proficient in such techniques.

However, it is very difficult to receive one-to-one education from an expert, and the number of trainees (practitioners) that the expert can educate is limited, although the expert attempts to educate many trainees.

Accordingly, an environment has recently been created in which more trainees can receive an education from an expert through education content by producing and providing the education content. As a representative example, there is an Internet lecture.

However, the existing education content is produced at the level of simply capturing/recording an image and a sound of the case where an expert performs (demonstrates) a technique. Accordingly, an education achieved by reproducing such education content has limitations in that, from the viewpoint of a trainee, the education is not only less realistic but also causes the trainee not to be able to experience the technique, that the expert performs, in a form other than sight/hearing.

Such existing limitations serve as a large drag on an increase of the level of achievement of an education from the viewpoint of a trainee who intends to acquire, particularly, a high level of technique, such as a soldier, a doctor, an airplane pilot, an athlete, and the like, as described above.

Therefore, the present disclosure proposes a new type of education content which enables the most realistic education on not only an image and a sound but also even the minute motion of an expert who is proficient in a high level of technique when the technique is performed by the expert.

SUMMARY OF THE DISCLOSURE

The present invention has been devised in view of the aforementioned circumstances, and an aspect of the present invention is to provide an apparatus and a method for providing realistic education media which enable the most realistic education on not only an image and a sound but also even the minute motion of an expert who is proficient in a high level of technique when the technique is performed by the expert.

In accordance with a first aspect of the present invention for achieving the above-mentioned objectives, an apparatus for providing realistic education media is provided. The apparatus includes: an education device that a user operates and through which the user demonstrates an education on a technique; multiple video image-capturers configured to image-capture a predetermined space including the education device at different locations; at least one sound recorder configured to record a sound generated in the predetermined space; a movement recorder configured to record movement information of the education device according to the operation of the education device; and a generator configured to generate one piece of realistic education media content by using the multiple pieces of video content which are image-captured by the multiple video image-capturers, the respective pieces of sound content recorded by the at least one sound recorder, and the movement information recorded by the movement recorder.

Preferably, the apparatus for providing realistic education media may further include: multiple display units to which the respective multiple pieces of video content are mapped, and configured to reproduce the pieces of video content mapped to the display units according to pieces of setting information, which are set for the pieces of video content, when the realistic education media content is reproduced; at least one sound output unit to which the respective pieces of sound content are mapped, and configured to reproduce the pieces of sound content mapped to the at least one sound output unit according to pieces of setting information, which are set for the pieces of sound content, when the realistic education media content is reproduced; and an education device driver configured to drive the education device according to the movement information when the realistic education media content is reproduced.

Preferably, the movement information may include at least one degree-of-freedom value among an x position value, a y position value, a z position value, a roll torque value, a pitch torque value, and a yaw torque value of the education device which are expressed in three dimensions.

Preferably, the generator may be configured to set video content setting information for each of the pieces of video content and use the video content setting information to generate the realistic education media content, wherein the video content setting information may be set based on a result of analyzing at least one of a location of a user and exposure and movement degrees of the education device in the video image in a case where the user operates the education device, and wherein the video content setting information may include at least one of a temporary stop time point during reproduction of video content, a retention time period of a temporary stop, and a reproduction time point after cancelling the temporary stop; and an enlargement time point of a particular area in a video image and an enlargement cancellation time point after an enlargement.

Preferably, the generator may be configured to set sound content setting information for each of the pieces of sound content and use the sound content setting information to generate the realistic education media content, wherein the sound content setting information may be set based on a result of analyzing at least one of whether a particular sound generated by movement of the education device is included, a volume of the particular sound, and whether a voice of a user is included, and wherein the sound content setting information may include at least one of a movement path of a sound output unit, a pattern of a movement speed of the sound output unit, and a sound volume adjustment value during the reproduction of the sound content.

Preferably, the apparatus for providing realistic education media may further include: a content manager configured to manage realistic education media content generated for each user; and a recommender configured to recommend realistic education media content of another user who has operated an education device identical to an education device in a case of particular realistic education media content when reproduction of the particular realistic education media content is selected, wherein, when reproduction of the recommended realistic education media content is selected, the generator may be configured to generate user comparison-realistic education media content by using the particular realistic education media content and the recommended realistic education media content.

Preferably, the particular realistic education media content may include comparison time periods in a predetermined unit, wherein the recommended realistic education media content may include corresponding time periods respectively corresponding to the comparison time periods of the particular realistic education media content, and wherein the generator may generate the user comparison-realistic education media content such that the comparison time period of the particular realistic education media content and the corresponding time period of the recommended realistic education media content are sequentially reproduced.

In accordance with a second aspect of the present invention for achieving the above-mentioned objectives, a method for providing realistic education media is provided. The method includes: an image-capturing step of image-capturing a predetermined space including an education device, that a user operates and through which the user demonstrates an education on a technique, at different locations by multiple video image-capturers; a recording step of recording a sound generated in the predetermined space by at least one sound recorder; a movement recording step of recording movement information of the education device according to the operation of the education device by a movement recorder; and a content generation step of generating one piece of realistic education media content by using the image-captured multiple pieces of video content, the recorded pieces of sound content, and the recorded movement information.

Preferably, the method may further include: reproducing, by the multiple display units to which the respective multiple pieces of video content are mapped, the pieces of video content mapped to the display units according to pieces of setting information, which are set for the pieces of video content, when the realistic education media content is reproduced; reproducing, by the at least one sound output unit to which the respective pieces of sound content are mapped, the pieces of sound content mapped to the at least one sound output unit according to pieces of setting information, which are set for the pieces of sound content, when the realistic education media content is reproduced; and an education device driving step of driving the education device according to the movement information when the realistic education media content is reproduced.

Preferably, the movement information may include at least one degree-of-freedom value among an x position value, a y position value, a z position value, a roll torque value, a pitch torque value, and a yaw torque value of the education device which are expressed in three dimensions.

Preferably, the content generation step may include: setting video content setting information for each of the pieces of video content and using the video content setting information to generate the realistic education media content, wherein the video content setting information may be set based on a result of analyzing at least one of a location of a user and exposure and movement degrees of the education device in the video image in a case where the user operates the education device, and wherein the video content setting information may include at least one of a temporary stop time point during reproduction of video content, a retention time period of a temporary stop, and a reproduction time point after cancelling the temporary stop; and an enlargement time point of a particular area in a video image and an enlargement cancellation time point after an enlargement.

Preferably, the content generation step may include: setting sound content setting information for each of the pieces of sound content and using the sound content setting information to generate the realistic education media content, wherein the sound content setting information may be set based on a result of analyzing at least one of whether a particular sound generated by movement of the education device is included, a volume of the particular sound, and whether a voice of a user is included, and wherein the sound content setting information may include at least one of a movement path of a sound output unit, a pattern of a movement speed of the sound output unit, and a sound volume adjustment value during the reproduction of the sound content.

Preferably, the method may further include: a content management step of managing realistic education media content generated for each user; a recommendation step of recommending realistic education media content of another user who has operated an education device identical to an education device in a case of particular realistic education media content when reproduction of the particular realistic education media content is selected; a comparison content generation step of generating user comparison-realistic education media content by using the particular realistic education media content and the recommended realistic education media content, when reproduction of the recommended realistic education media content is selected; and a step of reproducing the user comparison-realistic education media content.

Preferably, the comparison content generation step may include: extracting corresponding time periods respectively corresponding to comparison time periods of the particular realistic education media content from the recommended realistic education media content; and generating user comparison-realistic education media content configured such that the comparison time period of the particular realistic education media content and the corresponding time period of the recommended realistic education media content are sequentially reproduced.

Therefore, the apparatus and the method for providing realistic education media according to an embodiment of the present invention produce an effect such that the most realistic education can be performed on not only an image and a sound but also even the minute motion of an expert who is proficient in a high level of technique when the technique is performed by the expert.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE PREFERRED EMBODIMENTS

Figure 1:
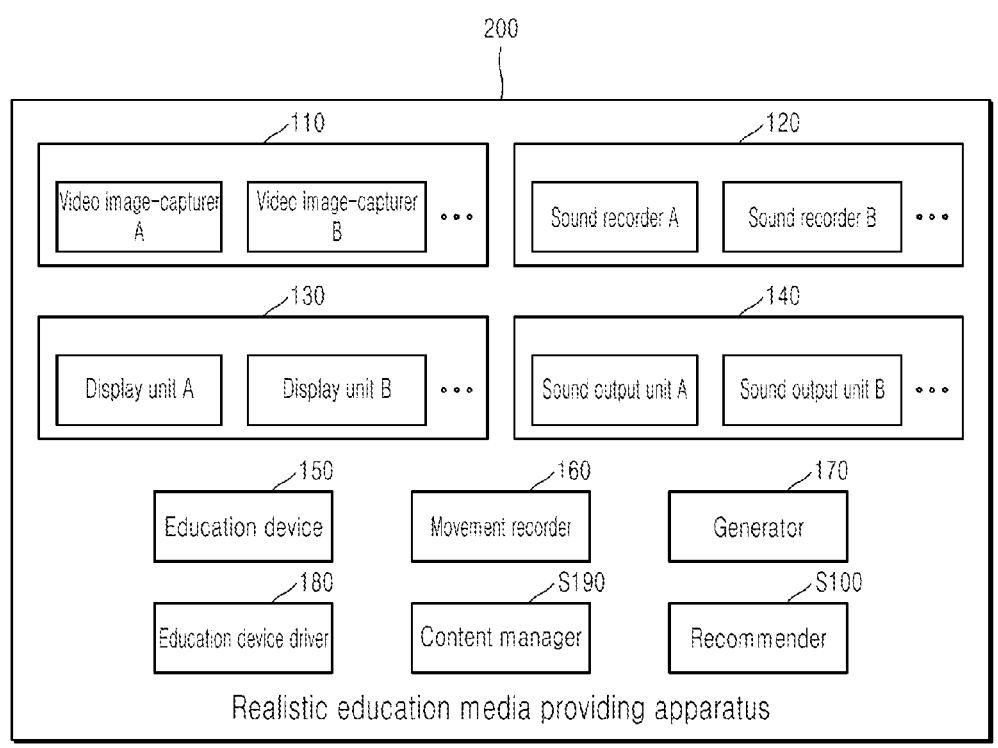
FIG. 1 is a block diagram illustrating a configuration of a realistic education media providing apparatus according to an exemplary embodiment of the present disclosure.

Hereinafter, embodiments of the present disclosure will be described in detail with reference to the accompanying drawings.

Before a detailed description of embodiments of the present disclosure with reference to the accompanying drawings, a field to which the present disclosure is applied will be described.

The present disclosure relates to a field of technical education achieved based on the reproduction of previously-produced (generated) education content.

Practitioners in fields which need continuous and repeated practice with the intention of acquiring a high level of technique, such as a soldier who handles a dangerous weapon such as a missile or a gun, a doctor who should perform various difficult surgeries, an airplane pilot who controls safety by a minute manipulation, an athlete whose acquisition of knowhow significantly affects a result, and the like, are continuously educated by experts who are already proficient in such techniques.

However, it is very difficult to receive one-to-one education from an expert, and the number of trainees (practitioners) that the expert can educate is limited, although the expert attempts to educate many trainees.

Accordingly, an environment has recently been created in which more trainees can receive an education from an expert through education content by producing and providing the education content. As a representative example, there is an Internet lecture.

However, the existing education content is produced at the level of simply capturing/recording an image and a sound of the case where an expert performs (demonstrates) a technique. Accordingly, an education achieved by reproducing the existing education content, to which a certain effort to recreate a realistic feeling as described above is not added, has a limitation in that the education is less realistic from the viewpoint of a trainee.

Also, the education achieved by reproducing the existing education content has a limitation in that the trainee cannot feel the technique, that the expert performs, in a form other than sight/hearing.

Such existing limitations serve as a large drag on an increase of the level of achievement of an education from the viewpoint of a trainee who intends to acquire, particularly, a high level of technique, such as a soldier, a doctor, an airplane pilot, an athlete, and the like, as described above.

Therefore, the purpose of the present disclosure is to propose a new type of education content (hereinafter "realistic education media content") which enables the most realistic education on not only an image and a sound but also even the minute motion of an expert who is proficient in a high level of technique when the technique is performed by the expert.

Hereinafter, referring to FIG. 1, a realistic education media providing apparatus according to an exemplary embodiment of the present disclosure will be described in detail.

First, a configuration of the realistic education media providing apparatus 200 according to an exemplary embodiment of the present disclosure will be described in terms of the generation of realistic education media content.

Referring to FIG. 1, the realistic education media providing apparatus 200 according to an exemplary embodiment of the present disclosure includes: an education device 150 that a user operates and through which the user demonstrates an education on a technique; multiple video image-capturers 110 that image-capture a predetermined space including the education device 150 at different locations; at least one sound recorder 120 that records a sound generated in the predetermined space; a movement recorder 160 that records movement information of the education device 150 according to the operation of the education device 150; and a generator 170 that generates one piece of realistic education media content by using the multiple pieces of video content which are image-captured by the multiple video image-capturers 110, the respective pieces of sound content recorded by the at least one sound recorder 120, and the movement information recorded by the movement recorder 160.

In a description made in terms of the generation of realistic education media content as described below, a user who demonstrates an education on a technique will be referred to as an "expert."

The education device 150 is an element that the user (i.e., the expert) operates and through which the user demonstrates an education on a technique.

For example, in the case of generation of realistic education media content for an education for soldiers, the education device 150 may be a related device that manages a weapon such as a missile or a gun, or may be a simulation device that recreates the related device.

Also, in the case of generation of realistic education media content for an education for doctors, the education device 150 may be a surgery device (or a surgery execution device) used during a surgery or the execution of the surgery, or may be a simulation device that recreates the surgery device (or the surgery execution device). In the case of generation of realistic education media content for an education for airplane pilots, the education device 150 may be an airplane piloting device or a simulation device that recreates the airplane piloting device. In the case of generation of realistic education media content for an education for athletes, the education device 150 may be an athletic device (e.g., a baseball bat, etc.) or a simulation device that recreates the athletic device (e.g., the baseball bat, etc.).

It goes without saying that the realistic education media providing apparatus 200 according to an embodiment of the present disclosure may generate pieces of realistic education media content for targeting and educating trainees in various fields as well as the above-described cases of the education for soldiers, the education for doctors, the education for airplane pilots, and the education for athletes, and may be provided with the education device 150, according to the generation of the realistic education media content.

In this regard, the education device 150 is based upon the premise of a form of being connected to the movement recorder 160 described below that needs to record the movement information of the education device 150.

Hereinafter, for convenience of description, a consideration will be given to and a description will be made of a case of generation of realistic education media content for the education for doctors.

The multiple video image-capturers 110 image-capture a predetermined space including the education device 150 at different locations.

As illustrated in FIG. 1, the multiple video image-capturers 110 signify video image-capturers A, B, and . . . that image-capture the predetermined space including the education device 150 at different locations.

At this time, the respective video image-capturers A, B, and . . . are based upon the premise of being disposed at different optimal locations, which enable the generation of optimal realistic education media content described below, in image-capturing the predetermined space including the education device 150.

Figure 2:
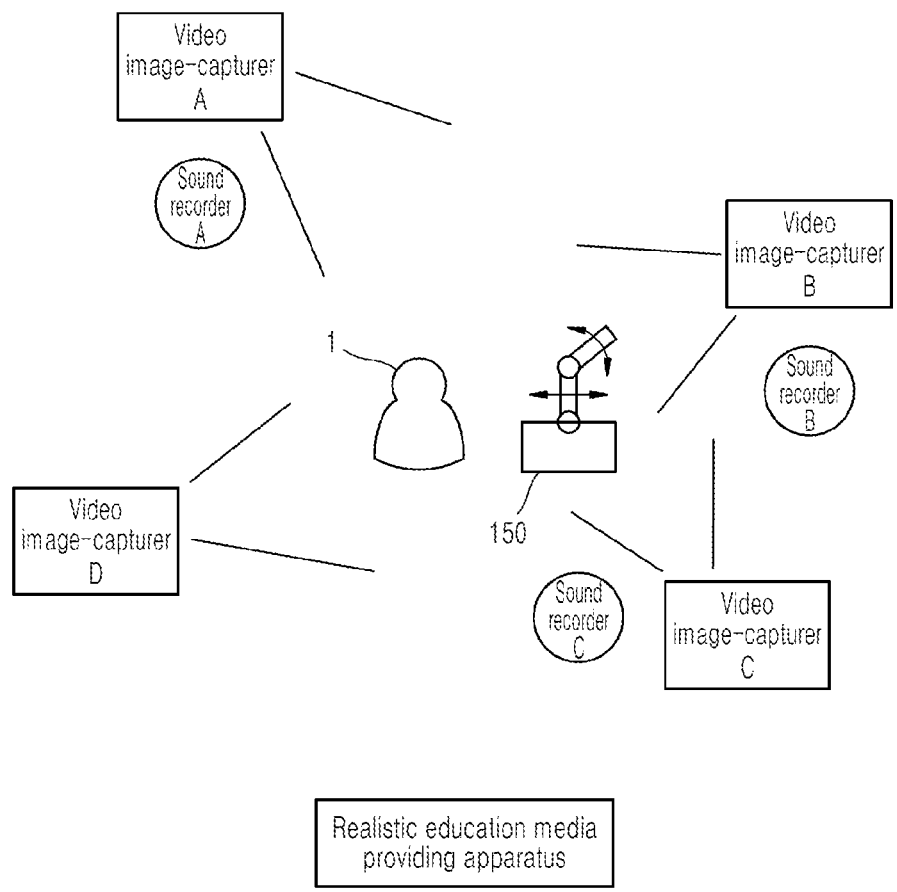
FIG. 2 is a view illustrating an example of a realistic education media content generation environment according to an exemplary embodiment of the present disclosure.

For example, as illustrated in FIG. 2, when an expert 1 operates the education device 150 and demonstrates an education on a technique through the education device 150, the video image-capturers A, B, C, and D may be disposed at different optimal locations which enable the generation of optimal realistic education media content in view of the location of the expert 1.

The at least one sound recorder 120 records a sound generated in a predetermined space, that is, the predetermined space including the education device 150.

The at least one sound recorder 120 may be one sound recorder, or may be the multiple sound recorders A, B, and . . . as illustrated in FIG. 1.

Hereinafter, for convenience of description, consideration will be given to and a description will be made of a case where the at least one sound recorder 120 includes the multiple sound recorders A, B, etc.

At this time, the respective sound recorders A, B, and . . . are based on the premise of being disposed at different optimal locations, which enable the generation of optimal realistic education media content described below, in recording a sound generated in the predetermined space including the education device 150.

For example, as illustrated in FIG. 2, when the expert 1 operates the education device 150 and demonstrates an education on a technique through the education device 150, the sound recorders A, B, and C may be disposed at different optimal locations which enable the generation of optimal realistic education media content in view of the dispositions of the video image-capturers A, B, C, and D.

The movement recorder 160 records movement information of the education device 150 according to the operation of the education device 150.

Specifically, when the expert 1 operates the education device 150 and demonstrates the education on the technique through the education device 150, the education device 150 is moved according to the operation of the education device 150 by the expert 1.

At this time, when the movement of the education device 150 is expressed as values mapped to a three-dimensional space, the movement of the education device 150 may be expressed as a maximum of six-degrees-of-freedom values.

For example, when the movement of the education device 150 is expressed as a position, the movement of the education device 150 may be expressed as degrees-of-freedom values which are an x-position value, a y-position value, and a z-position value. When the movement of the education device 150 is expressed as a force, the movement of the education device 150 is expressed as degrees-of-freedom values which are a roll torque value, a pitch torque value, a yaw torque value.

Accordingly, when the expert 1 operates the education device 150 and demonstrates the education on the technique through the education device 150, the movement recorder 160 tracks/analyzes the movement of the education device 150 according to the operation of the education device 150, and records movement information including at least one degree-of-freedom value among an x position value, a y position value, a z position value, a roll torque value, a pitch torque value, and a yaw torque value of the education device 150 which are expressed in three dimensions.

In order to generate realistic education media content, when the expert 1 operates the education device 150 and demonstrates the education on the technique through the education device 150, the video image-capturers 110, the sound recorder 120, and the movement recorder 160 as described above are synchronized with each other and perform image-capturing, sound-recording, and movement information recording which are respective roles thereof.

The generator 170 generates one piece of realistic education media content by using the multiple pieces of video content which have been image-captured by the video image-capturers 110, the respective pieces of sound content recorded by the sound recorder 120, and the movement information recorded by the movement recorder 160.

Hereinafter, a process of generating realistic education media content will be described in more detail.

The generator 170 may use setting information to generate realistic education media content after, for each of the multiple pieces of video content, the generator 170 sets the setting information including at least one of a temporary stop time point during reproduction of video content, a retention time period of the temporary stop, and a reproduction time point after cancelling the temporary stop; and an enlargement time point of a particular area in a video image and an enlargement cancellation time point after the enlargement, on the basis of a result of analyzing at least one of the location of the expert 1 and the exposure and movement degrees of the education device 150 in the video image in a case where the expert 1 operates the education device 150.

Referring to FIG. 2, specifically, the generator 170 analyzes at least one of the location of the expert 1 in the case where the expert 1 operates the education device 150 and the exposure and movement degrees of the education device 150 in a video image, for each of the multiple pieces of video content (i.e., the pieces of video content respectively image-captured by the video image-capturers A, B, C, and D).

The generator 170 analyzes the location of the expert 1 in the case where the expert 1 operates the education device 150, for each of the pieces of video content respectively image-captured by the video image-capturers A, B, C, and D.

For example, when a description is made with reference to the video content image-captured by the video image-capturer A, the generator 170 may analyze the location of the expert 1 in the case where the expert 1 operates the education device 150, with the location of the video image-capturer A as a reference, and may determine whether the video content image-captured by the video image-capturer A is a video image at an angle from which the expert 1 cannot see the video image in an actual visual field of the expert 1.

A trainee (reference numeral 2 in FIG. 3) receives an education in such a manner that the trainee who is to receive the education by reproducing the realistic education media content proposed in the present disclosure holds the education device 150 in the hand of the trainee, and thereby feels the motion in the case of the education on a technique that the expert 1 has demonstrated. Accordingly, the location of the expert 1 who operates the education device 150 and demonstrates the education of the technique through the education device 150 may be regarded as the location of the trainee 2.

Therefore, the consideration of the location of the expert 1 in the case where the expert 1 operates the education device 150 may be regarded as being identical in meaning to that of the subsequent location of the trainee 2.

In this manner, with respect to the respective pieces of video content image-captured by the video image-capturers B, C, and D in addition to the video image-capturer A, the generator 170 may analyze the location of the expert 1 in the case where the expert 1 operates the education device 150, with the location of each of the video image-capturers B, C, and D as a reference, and may determine whether the video content image-captured by each of the video image-capturers B, C, and D is a video image at an angle from which the expert 1 cannot see the video image in the actual visual field of the expert 1.

Also, the generator 170 analyzes at least one of the exposure and movement degrees of the education device 150 in a video image, for each of the pieces of video content image-captured by the video image-capturers A, B, C, and D.

For example, the following description will be made with reference to the video content image-captured by the video image-capturer A.

The generator 170 analyzes the exposure degree of the education device 150 in a video image of the video content image-captured by the video image-capturer A. Accordingly, the generator 170 may determine whether the exposure degree of the education device 150 in the video image is less than a predefined minimum exposure degree.

Also, the generator 170 analyzes the movement degree of the education device 150 in the video image of the video content image-captured by the video image-capturer A. Accordingly, the generator 170 may determine whether the movement degree of the education device 150 in the video image is less than a predefined minimum movement degree.

In this manner, with respect to the respective pieces of video content image-captured by the video image-capturers B, C, and D in addition to the video image-capturer A, the generator 170 may determine whether the exposure degree of the education device 150 in the video image of each video content is less than a minimum exposure degree, and may determine whether the movement degree of the education device 150 in the video image of each video content is less than a minimum movement degree.

Thereafter, the generator 170 sets setting information for each video content on the basis of an analysis result obtained by analyzing the location (=that of the trainee 2) of the expert 1 in the case where the expert 1 operates the education device 150, and the exposure information and movement information of the education device 150 in the video image, for each of the pieces of video content image-captured by the respective video image-capturers A, B, C, and D as described above, in which the analysis result corresponds to whether the video content is a video image at the angle from which the expert 1 cannot see the video image in the actual visual field of the expert 1, whether the exposure degree of the education device 150 in the video image of each video content is less than the minimum exposure degree, and whether the movement degree of the education device 150 in the video image of each video content is less than the minimum movement degree.

More specifically, the generator 170 sets setting information, which is used to maintain the reproduction of the video content, for the video content determined as the video image at the angle from which the expert 1 cannot see the video image in the actual visual field of the expert 1, regardless of whether the exposure degree of the education device 150 in the video image of each video content is less than the minimum exposure degree as described below.

Also, the generator 170 sets setting information, which defines a temporary stop time point during reproduction of video content, a retention time period of the temporary stop, and a reproduction time point after cancelling the temporary stop, for video content determined as a video image at an angle from which the expert 1 can see the video image in the actual visual field of the expert 1, according to whether the exposure degree of the education device 150 in the video image of each video content is less than the minimum exposure degree.

For example, consideration is given to a case where it is analyzed (determined) that the exposure degree of the education device 150 is less than the minimum exposure degree, from a video image at a particular time point (e.g., a time point at which reproduction is performed for five minutes from the start of the reproduction) to a video image at a time point at which two minutes pass from the particular time point during the reproduction of the video content image-captured by the video image-capturer B.

In this case, for the video content image-captured by the video image-capturer B, the generator 170 may set setting information which defines the above-described particular time point (e.g., the time point at which reproduction is performed for five minutes from the start of the reproduction) as a temporary stop time point, defines two minutes as a retention time period of the temporary stop, and defines a time point at which two minutes pass from the particular time point (e.g., the time point at which reproduction is performed for five minutes from the start of the reproduction) as a reproduction time point after cancelling the temporary stop.

This is because a reproduction time period, during which the education device 150 is hardly exposed, may exist among the pieces of video content image-captured at multiple locations, and the reproduction time period and the reproduction of realistic education media content may be temporarily stopped when an education is performed based on the realistic education media content.

Then, the generator 170 sets setting information, which defines an enlargement time point of a particular area in a video image and an enlargement cancellation time point after the enlargement, for both video content determined as a video image at an angle from which the expert 1 cannot see the video image in the actual visual field of the expert 1 and video content determined as a video image at an angle from which the expert 1 can see the video image in the actual visual field of the expert 1, according to whether the movement degree of the education device 150 in the video image of each video content is less than the minimum movement degree.

Here, the particular area may be designated as an area of a preset size which includes the education device 150 in a whole area of a video image and in which a change most frequently occurs as compared with a previously-reproduced video image frame.

For example, consideration is given to a case where it is analyzed (determined) that the movement degree of the education device 150 is less than the minimum movement degree from a video image at a particular time point (e.g., a time point at which reproduction is performed for five minutes from the start of the reproduction) to a video image at which two minutes pass from the particular time point during the reproduction of the video content image-captured by the video image-capturer C.

In this case, for the video content image-captured by the video image-capturer C, the generator 170 may set setting information which defines the above-described particular time point (e.g., the time point at which reproduction is performed for five minutes from the start of the reproduction), as an enlargement time point of the particular area, and defines a time point at which two minutes pass from the particular time point (e.g., the time point at which reproduction is performed for five minutes from the start of the reproduction) as an enlargement cancellation time point after the enlargement.

This is because a reproduction time period during which a delicate technique corresponding to the minute movement of the education device 150 is being demonstrated may exist among the pieces of video content image-captured at multiple locations and the reproduction time period needs to be shown in detail through enlargement when an education is performed based on the reproduction of realistic education media content.

In the above-described manner, the generator 170 may set setting information for each of the pieces of video content image-captured by the respective video image-capturers A, B, C, and D, and may then use the setting information to generate realistic education media content.

Also, the generator 170 may use setting information to generate the realistic education media content after, for each sound content, the generator 170 sets the setting information, which includes at least one of a movement path of a sound output unit mapped during the reproduction of the sound content, a pattern of the movement speed of the sound output unit, and a sound volume adjustment value during the reproduction of the sound content, on the basis of a result of analyzing at least one of whether a particular sound generated by the movement of the education device 150 is included, the volume of the particular sound, and whether the voice of the expert 1 is included.

Referring to FIG. 2, specifically, the generator 170 analyzes at least one of whether a particular sound generated by the movement of the education device 150 is included, the volume of the particular sound, and whether the voice of the expert 1 is included, for each sound content, that is, for each of the pieces of sound content recorded by the respective sound recorders A, B, and C.

The generator 170 analyzes whether the particular sound generated by the movement of the education device 150 is included and the volume of the particular sound, for each of the pieces of sound content recorded by the respective sound recorders A, B, and C.

For example, the following description will be made with reference to the sound content recorded by the sound recorder A.

The generator 170 analyzes whether the particular sound generated by the movement of the education device 150 is included in a sound of the sound content recorded by the sound recorder A, and the volume of the particular sound. Accordingly, when the particular sound generated by the movement of the education device 150 is included in a sound of the sound content recorded by the sound recorder A, the generator 170 may determine whether the volume of the particular sound is less than a predefined particular volume.

In this manner, with respect to each of the pieces of sound content recorded by the respective sound recorders B and C in addition to the sound recorder A, the generator 170 may analyze whether the particular sound generated by the movement of the education device 150 is included in a sound of the sound content, and the volume of the particular sound, and thereby may determine whether the particular sound generated by the movement of the education device 150 is included in each of the pieces of sound content recorded by the respective sound recorders B and C. When the particular sound is included in each of the pieces of sound content recorded by the respective sound recorders B and C, the generator 170 may determine whether the volume of the particular sound is less than a particular volume.

Also, the generator 170 analyzes whether the voice of the expert 1 is included, for each of the pieces of sound content recorded by the respective sound recorders A, B, and C.

For example, when a description is made with reference to the sound content recorded by the sound recorder A, the generator 170 analyzes whether the voice of the expert 1 is included in a sound of the sound content recorded by the sound recorder A.

In this manner, the generator 170 may analyze whether the voice of the expert 1 is included in a sound of the sound content, with respect to each of the pieces of sound content recorded by the respective sound recorders B and C in addition to the sound recorder A.

Thereafter, as described above, the generator 170 sets setting information for each sound content, on the basis of a result of the analysis for each of the pieces of sound content recorded by the respective sound recorders A, B and C, that is, whether the particular sound generated by the movement of the education device 150 is included in a sound of the sound content, whether the volume of the particular sound is less than the particular volume when the particular sound is included in the sound of the sound content, and whether the voice of the expert 1 is included in the sound of the sound content.

More specifically, for the sound content determined to include the particular sound generated by the movement of the education device 150, the generator 170 sets setting information, which defines a movement path of a sound output unit mapped during the reproduction of the sound content, a pattern of the movement speed of the sound output unit, and a sound volume adjustment value during the reproduction of the sound content, according to whether the volume of the particular sound is less than the particular volume.

For example, consideration is given to a case where it is analyzed (determined) that the particular sound generated by the movement of the education device 150 is included from a sound at a particular time point (e.g., a time point at which reproduction is performed for five minutes from the start of the reproduction) to a sound at a time point at which 10 minutes pass from the particular time point during the reproduction of the sound content recorded by the sound recorder B, and where a partial reproduction time period, during which the volume of the particular sound is less than the particular volume, exists between the particular time point (e.g., the time point at which reproduction is performed for five minutes from the start of the reproduction) and a time point at which 10 minutes pass from the particular time point.

In this case, the generator 170 may set, for the sound content recorded by the sound recorder B, setting information which defines a sound volume adjustment value so as to increase the sound volume adjustment value from a default value (an initial volume value) by a predetermined magnitude during the reproduction of the sound content from the particular time point (e.g., the time point at which reproduction is performed for five minutes from the start of the reproduction) to the time point at which 10 minutes pass from the particular time point, defines a movement path along which the sound output unit (e.g., as indicated by reference numeral 140B in FIG. 1) mapped during the partial reproduction time period, for which the volume of the particular sound is less than the particular volume, moves to the location of the expert 1 (=that of the trainee 2), and defines a pattern of a movement speed according to the defined movement path as one of a first pattern representing a movement at a predetermined speed, a second pattern representing a movement with acceleration, and a third pattern representing a movement at a speed which is variable according to the volume of the particular sound.

This configuration is for increasing a realistic feeling of the education by enabling the trainee 2 to well listen to the particular sound (i.e., a minute sound) generated by the movement of the education device 150 among the pieces of sound content recorded at multiple locations.

Then, the generator 170 sets setting information which defines a sound volume adjustment value during reproduction during a reproduction time period including the voice of the expert 1, for the sound content analyzed (determined) to include the voice of the expert 1.

For example, consideration is given to a case where it is analyzed (determined) that the voice of the expert 1 is included from a sound at a particular time point (e.g., a time point at which reproduction is performed for five minutes from the start of the reproduction) to a sound at a time point at which 10 minutes pass from the particular time point during the reproduction of the sound content recorded by the sound recorder C.

In this case, the generator 170 may set, for the sound content recorded by the sound recorder C, setting information which defines a sound volume adjustment value so as to increase the sound volume adjustment value from a default value by a predetermined magnitude during the reproduction of the sound content from the particular time point (e.g., the time point at which reproduction is performed for five minutes from the start of the reproduction) to a time point at which 10 minutes pass from the particular time point.

This configuration is for enabling the trainee 2 to well listen to an explanation made by the expert 1 which is being demonstrated among the pieces of sound content recorded at multiple locations.

In the above-described manner, the generator 170 may set setting information for each of the pieces of sound content recorded by the respective sound recorders A, B, and C, and may then use the setting information to generate realistic education media content.

Accordingly, the realistic education media content generated by the generator 170 may be generated in the form of combining the pieces of video content which have been image-captured by the respective video image-captures A, B, C, and D and for which the respective pieces of setting information are set, the pieces of sound content which have been recorded by the respective sound recorders A, B, C, and D and for which the respective pieces of setting information are set, and the movement information recorded by the movement recorder 160.

Hereinafter, a description will be made in terms of a case where realistic education media content is reproduced and a realistic education media content reproduction-based education is performed by the realistic education media providing apparatus 200 according to an embodiment of the present disclosure.

To this end, as illustrated in FIG. 1, the realistic education media providing apparatus 200 according to an embodiment of the present disclosure may further include multiple display units 130, at least one sound output unit 140, and an education device driver 180.

Hereinafter, for convenience of description, similarly to the above-described consideration, consideration will be given to and a description will be made of a case of reproduction of realistic education media content generated for the education for doctors.

Respective multiple pieces of video content are mapped to the multiple display units 130; and when the realistic education media content is reproduced, the multiple display units 130 reproduce the pieces of video content, which are included in the realistic education media content and are mapped to the respective display units 130, according to the pieces of setting information which are set for the pieces of video content.

As illustrated in FIG. 1, the multiple display units 130 signify display units A, B, etc.

At this time, the respective display units A, B, and . . . are based on the premise of being disposed at optimal locations that enable the trainee 2, who receives a realistic education media content reproduction-based education, to realistically view the pieces of video content in reproducing the pieces of video content.

Figure 3:
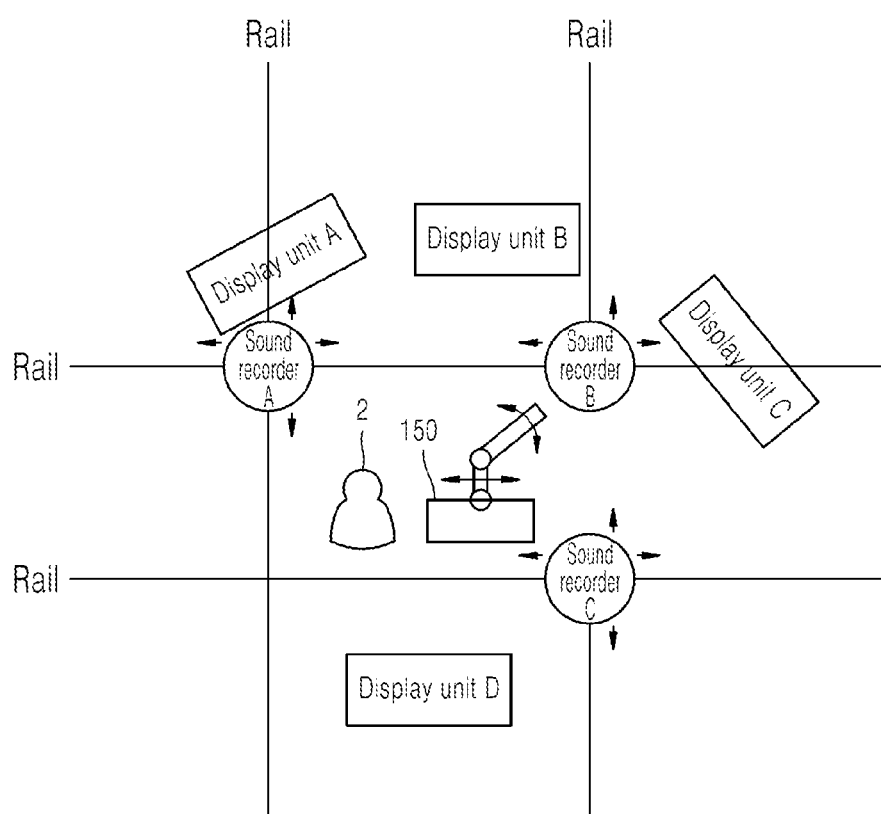
FIG. 3 is a view illustrating an example of a realistic education media content reproduction environment according to an exemplary embodiment of the present disclosure.

For example, as illustrated in FIG. 3, when the trainee 2 holds the education device 150 in the hand of the trainee 2 and receives the education, the display units A, B, C, and D may be disposed at optimal locations, which enable the trainee 2 to realistically view the respective pieces of video content displayed during the reproduction of the realistic education media content, in view of the location of the trainee 2.

At this time, it is preferable that the video image-capturers A, B, C, and D illustrated in FIG. 2 are mapped one-to-one to the display units A, B, C, and D illustrated in FIG. 3, respectively.

In this configuration, video content image-captured by the video image-capturer A is mapped to the display unit A, video content image-captured by the video image-capturer B is mapped to the display unit B, video content image-captured by the video image-capturer C is mapped to the display unit C, and video content image-captured by the video image-capturer D is mapped to the display unit D.

Accordingly, when a description is made with reference to the display unit A as an example, the display unit A reproduces video content mapped to the display unit A (i.e., the video content image-captured by the video image-capturer A) according to setting information, which is set for the video content, during the reproduction of the realistic education media content.

In this manner, each of the display units B, C, and D also reproduces video content mapped to each of the display units B, C, and D (i.e., the video content image-captured by each of the video image-capturers B, C, and D) according to setting information, which is set for the video content, during the reproduction of the realistic education media content.

Accordingly, while the trainee 2 receives the realistic education media content reproduction-based education, the trainee 2 may receive a realistic education such that the trainee 2 is capable of focusing on and viewing video content of which the reproduction is maintained rather than video content in a state of being temporarily stopped while viewing the multiple pieces of video content, and that the trainee 2 is capable of focusing on and viewing video content automatically enlarged at an important moment (i.e., a reproduction time period during which a delicate technique corresponding to the minute movement of the education device 150 is being demonstrated).

The respective pieces of sound content are mapped to the at least one sound output unit 140; and when the realistic education media content is reproduced, the at least one sound output unit 140 reproduces the pieces of sound content, which are included in the realistic education media content and are mapped to the at least one sound output unit 140, according to the pieces of setting information which are set for the pieces of sound content.

The at least one sound output unit 140 may be one sound output unit, or may be the multiple sound output units A, B, and . . . as illustrated in FIG. 1.

Hereinafter, for convenience of description, consideration will be given to and a description will be made of a case where the at least one sound output unit 140 includes the multiple sound output units A, B, etc.

At this time, the respective sound output units A, B, and . . . are based on the premise of being disposed at optimal locations, which enable the trainee 2, who receives the realistic education media content reproduction-based education, to realistically listen to the pieces of sound content, in reproducing the pieces of sound content.

For example, as illustrated in FIG. 3, when the trainee 2 holds the education device 150 in the hand of the trainee 2 and receives the education, the sound output units A, B, C, and D may be disposed at optimal locations, which enable the trainee 2 to realistically listen to the respective pieces of sound content which are output during the reproduction of the realistic education media content, in view of the location of the trainee 2.

At this time, it is preferable that the sound recorders A, B, and C illustrated in FIG. 2 are mapped one-to-one to the sound output units A, B, and C illustrated in FIG. 3, respectively.

In this configuration, sound content recorded by the sound recorder A is mapped to the sound output unit A, sound content recorded by the sound recorder B is mapped to the sound output unit B, and sound content recorded by the sound recorder C is mapped to the sound output unit C.

Accordingly, in the case of describing the sound output unit A as an example, when the realistic education media content is reproduced, the sound output unit A reproduces sound content mapped to the sound output unit A (i.e., the sound content recorded by the sound recorder A) while automatically adjusting a sound volume value or moving according to a movement path in a movement speed pattern, according to setting information which is set for the sound content.

In this manner, when the realistic education media content is reproduced, each of the sound output units B and C also reproduces sound content mapped to each of the sound output units B and C (i.e., the sound content recorded by each of the sound recorders B and C) while automatically adjusting a sound volume value or moving according to a movement path in a movement speed pattern, according to setting information which is set for the sound content.

Also, in FIG. 3, each of the sound output units A, B, and C is disposed (installed) on a rail so as to be movable. However, this configuration is only an example.

In addition to a scheme for adopting the rail as illustrated in FIG. 3, each of the sound output units A, B, and C may be movable according to a scheme in which each of the sound output units A, B, and C is provided with an independent movement means (e.g., a wheel).

Accordingly, while the trainee 2 receives the realistic education media content reproduction-based education, the trainee 2 may receive a realistic education such that the trainee 2 more carefully listens to an important matter, such as the contents of an explanation that the expert 1 makes, a minute sound generated by the movement of the education device 150, and the like, while listening to multiple pieces of sound content.

When the realistic education media content is reproduced, the education device driver 180 performs a control operation for moving the education device 150 according to movement information.

That is, when the realistic education media content is reproduced, the education device driver 180 performs a control operation for moving the education device 150 according to an x-position value, a y-position value, a z-position value, a roll torque value, a pitch torque value, and a yaw torque value of movement information included in the realistic education media content.

Accordingly, while the trainee 2 receives the realistic education media content reproduction-based education, the trainee 2 may receive the education while the trainee 2 holds the education device 150 in the hand of the trainee 2 and feels, as it is, the movement of the education device 150 according to a technique that the expert 1 demonstrates.

In addition, the realistic education media providing apparatus 200 according to an embodiment of the present disclosure may further include a content manager 190 and a recommender 100.

The content manager 190 manages realistic education media content generated for each expert.

That is, in the realistic education media providing apparatus 200, the content manager 190 classifies pieces of realistic education media content, which are generated by multiple experts, according to an expert and manages the classified pieces of realistic education media content.

When the reproduction of particular realistic education media content is selected, the recommender 100 recommends realistic education media content of another expert who has operated an education device which is identical to that of the case of the particular realistic education media content.

That is, if a selection is made of the reproduction of the particular realistic education media content that the realistic education media providing apparatus 200 is desired to reproduce for an education, when there exists realistic education media content of another expert who has operated an education device identical to that of the case of the particular realistic education media content, the recommender 100 recommends the realistic education media content of another expert.

When the reproduction of the recommended realistic education media content is selected, the generator 170 generates expert comparison-realistic education media content by using the particular realistic education media content and the recommended realistic education media content.

Specifically, when the reproduction of the recommended realistic education media content is selected, the recommendation may be regarded as being approved for the recommended realistic education media content.

When the reproduction of the recommended realistic education media content is selected, that is, when the recommendation is approved, the generator 170 may generate the expert comparison-realistic education media content having a form, which enables the trainee to compare and experience the respective techniques that both experts have demonstrated through the identical education device, by using the particular realistic education media content, which is desired to be selected and reproduced, and the recommended realistic education media content.

More specifically, the generator 170 divides the particular realistic education media content into parts at comparison time periods in a predetermined unit. For example, the generator 170 may divide the particular realistic education media content into parts at comparison time periods in a unit of 10 minutes.

The generator 170 extracts corresponding time periods respectively corresponding to the comparison time periods of the particular realistic education media content, from the recommended realistic education media content.

For example, the generator 170 may compare pieces of movement information respectively corresponding to the comparison time periods of the particular realistic education media content with pieces of movement information of the recommended realistic education media content, may find a time period having the highest matching ratio of movement information in the recommended realistic education media content for each comparison time period, and may extract the found time period as a corresponding time period corresponding to the comparison time period.

Thereafter, the generator 170 may generate the expert comparison-realistic education media content configured such that the comparison time period of the particular realistic education media content and the corresponding time period of the recommended realistic education media content are sequentially reproduced in a predetermined unit (i.e., 10 minutes).

Accordingly, when the expert comparison-realistic education media content is reproduced, the display units A, B, C, and D, the sound output units A, B, and C, and the education device driver 180 may cause the trainee 2 to compare and experience respective techniques that both experts have demonstrated through the identical education device, by sequentially repeating an operation of reproducing a comparison time period in a unit of 10 minutes of the particular realistic education media content, and a corresponding time period in a unit of 10 minutes of the recommended realistic education media content; and an operation of again reproducing a next comparison time period in the unit of 10 minutes of the particular realistic education media content, and a next corresponding time period in the unit of 10 minutes of the recommended realistic education media content.

As described above, the realistic education media providing apparatus 200 according to an embodiment of the present disclosure provides a realistic education media content reproduction-based education environment which enables a trainee to receive a more realistic education by generating a new type of education content (i.e., realistic education media content) which enables the most realistic education on not only an image and a sound but also even the minute motion of an expert who is proficient in a high level of technique when the technique is performed by the expert, and by reproducing the realistic education media content.

Accordingly, the realistic education media providing apparatus 200 can overcome the limitations of an education using the existing education content, and can produce an effect such that the most realistic education can be performed on not only an image and a sound but also even the minute motion of an expert who is proficient in a high level of technique when the technique is performed by the expert.

Figure 4:
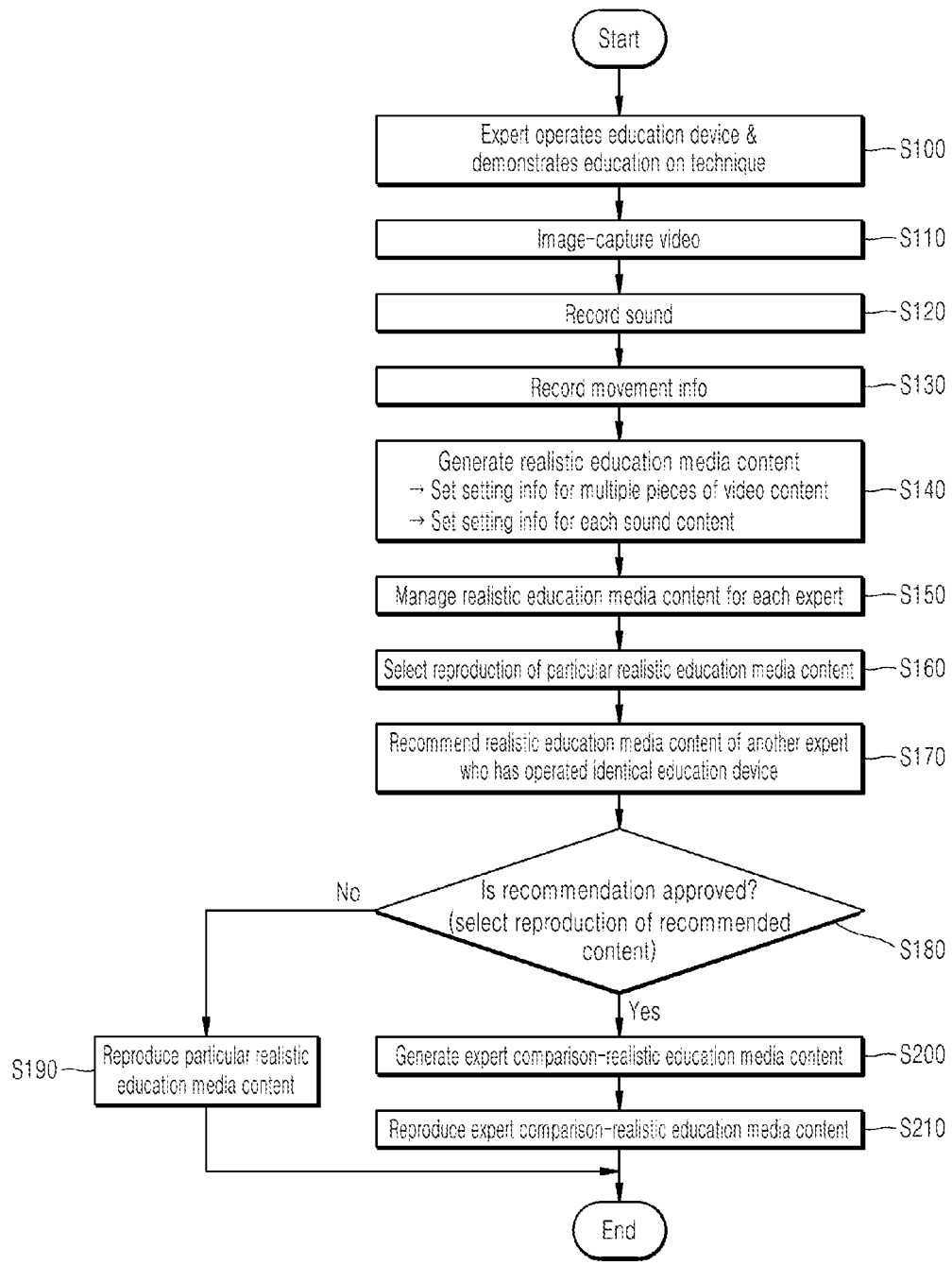
FIG. 4 is a flowchart illustrating the flow of a realistic education media providing method according to an exemplary embodiment of the present disclosure.

Hereinafter, a realistic education media providing method according to an exemplary embodiment of the present disclosure will be described with reference to FIG. 4.

For convenience of description, the realistic education media providing method according to an embodiment of the present disclosure will be named an "operating method of the realistic education media providing apparatus 200" and a description thereof will be made.

In the operating method of the realistic education media providing apparatus 200 according to an embodiment of the present disclosure, when the expert operates the education device 150 and demonstrates an education on a technique through the education device 150 in step S100, in step S110, a predetermined space including the education device 150 is image-captured at different locations.

For example, as illustrated in FIG. 2, when the expert 1 operates the education device 150 and demonstrates the education on the technique through the education device 150, the video image-capturers A, B, C, and D may be disposed at different optimal locations which enable the generation of an optimal realistic education media content in view of the location of the expert 1.

Accordingly, the operating method of the realistic education media providing apparatus 200 according to an embodiment of the present disclosure may control the video image-capturers A, B, C, and D to image-capture the predetermined space including the education device 150.

Also, when the expert 1 operates the education device 150 and demonstrates the education on the technique through the education device 150 in step S100, in step S120, the operating method of the realistic education media providing apparatus 200 according to an embodiment of the present disclosure records a sound generated in a predetermined space, that is, the predetermined space including the education device 150.

For example, as illustrated in FIG. 2, when the expert 1 operates the education device 150 and demonstrates the education on the technique through the education device 150, the sound recorders A, B, and C may be disposed at different optimal locations which enable the generation of optimal realistic education media content in view of the dispositions of the video image-capturers A, B, C, and D.

Accordingly, the operating method of the realistic education media providing apparatus 200 according to an embodiment of the present disclosure may control the sound recorders A, B, and C to record the sound generated in the predetermined space.

Also, when the expert 1 operates the education device 150 and demonstrates the education on the technique through the education device 150 in step S100, in step S130, the operating method of the realistic education media providing apparatus 200 according to an embodiment of the present disclosure records movement information of the education device 150 according to the operation of the education device 150.

Specifically, the operating method of the realistic education media providing apparatus 200 according to an embodiment of the present disclosure records movement information including at least one degree-of-freedom value among an x position value, a y position value, a z position value, a roll torque value, a pitch torque value, and a yaw torque value of the education device 150 according to the operation of the education device 150.

In step S140, the operating method of the realistic education media providing apparatus 200 according to an embodiment of the present disclosure generates one piece of realistic education media content by using the multiple pieces of video content which have been image-captured in step S110, the respective pieces of sound content recorded in step S120, and the movement information recorded in step S130.

More specifically, for each of the multiple pieces of video content image-captured by the respective video image-capturers A, B, C, and D, the operating method of the realistic education media providing apparatus 200 according to an embodiment of the present disclosure sets setting information including at least one of a temporary stop time point during reproduction of video content, a retention time period of the temporary stop, and a reproduction time point after cancelling the temporary stop; and an enlargement time point of a particular area in a video image and an enlargement cancellation time point after the enlargement, on the basis of a result of analyzing at least one of the location of the expert 1 and the exposure and movement degrees of the education device 150 in the video image in a case where the expert 1 operates the education device 150.

Also, for each of the pieces of sound content recorded by the respective sound recorders A, B, and C, the operating method of the realistic education media providing apparatus 200 according to an embodiment of the present disclosure sets setting information, which includes at least one of a movement path of a sound output unit mapped during the reproduction of the sound content, a pattern of the movement speed of the sound output unit, and a sound volume adjustment value during the reproduction of the sound content, on the basis of a result of analyzing at least one of whether a particular sound generated by the movement of the education device 150 is included, the volume of the particular sound, and whether the voice of the expert 1 is included.

Thereafter, the operating method of the realistic education media providing apparatus 200 according to an embodiment of the present disclosure may generate realistic education media content in the form of the combination of the respective pieces of video content which have been image-captured by the video image-capturers A, B, C, and D and for which the pieces of setting information are set, the respective pieces of sound content which have been recorded by the sound recorders A, B, and C and for which the pieces of setting information are set, and the movement information as recorded above.

Then, in step S150, the operating method of the realistic education media providing apparatus 200 according to an embodiment of the present disclosure manages the realistic education media content generated as described above for each expert. That is, the realistic education media providing apparatus 200 classifies and manages the pieces of realistic education media content, which have been generated by multiple experts, for each expert.

Hereinafter, a description will be made in terms of a case where realistic education media content is reproduced and a realistic education media content reproduction-based education is performed by the realistic education media providing apparatus 200 according to an embodiment of the present disclosure.

When the reproduction of particular realistic education media content, that the realistic education media providing apparatus 200 desires to reproduce for an education, is selected in step S160, in step S170, if there exists realistic education media content of another expert who has operated an education device which is identical to that of the case of the particular realistic education media content, the operating method of the realistic education media providing apparatus 200 according to an embodiment of the present disclosure recommends the realistic education media content.

When the reproduction of the recommended realistic education media content is not selected, that is, the recommendation is not approved, (No in step S180), in step S190, the operating method of the realistic education media providing apparatus 200 according to an embodiment of the present disclosure reproduces the particular realistic education media content.

That is, the operating method of the realistic education media providing apparatus 200 according to an embodiment of the present disclosure reproduces the particular realistic education media content by controlling the display units A, B, and C to reproduce the pieces of video content, which are included in the particular realistic education media content and are mapped to the respective display units A, B, and C, according the pieces of setting information which are set for the respective pieces of video content; by controlling the sound output units A, B, and C to reproduce the pieces of sound content, which are included in the particular realistic education media content and are mapped to the respective sound output units A, B, and C, according the pieces of setting information which are set for the respective pieces of sound content; and by performing a control operation for moving the education device 150 according to an x position value, a y position value, a z position value, a roll torque value, a pitch torque value, and a yaw torque value of the movement information included in the particular realistic education media content.

Meanwhile, when the reproduction of the recommended realistic education media content is selected, that is, the recommendation is approved, (Yes in step S180), in step S200, the operating method of the realistic education media providing apparatus 200 according to an embodiment of the present disclosure may generate expert comparison-realistic education media content having a form, which enables the trainee to compare and experience the respective techniques that both experts have demonstrated through the identical education device, by using the particular realistic education media content, which has been desired to be selected and reproduced, and the recommended realistic education media content.

More particularly, the operating method of the realistic education media providing apparatus 200 according to an embodiment of the present disclosure divides the particular realistic education media content into parts at comparison time periods in a predetermined unit. For example, the operating method of the realistic education media providing apparatus 200 according to an embodiment of the present disclosure may divide the particular realistic education media content into parts at comparison time periods in a unit of 10 minutes.

The operating method of the realistic education media providing apparatus 200 according to an embodiment of the present disclosure extracts corresponding time periods respectively corresponding to the comparison time periods of the particular realistic education media content, from the recommended realistic education media content.

For example, the operating method of the realistic education media providing apparatus 200 according to an embodiment of the present disclosure may compare pieces of movement information respectively corresponding to the comparison time periods of the particular realistic education media content with pieces of movement information of the recommended realistic education media content, may find a time period having the highest matching ratio of movement information in the recommended realistic education media content for each comparison time period, and may extract the found time period as a corresponding time period corresponding to the comparison time period.

Thereafter, the operating method of the realistic education media providing apparatus 200 according to an embodiment of the present disclosure may generate the expert comparison-realistic education media content configured such that the comparison time period of the particular realistic education media content and the corresponding time period of the recommended realistic education media content are sequentially reproduced in a predetermined unit (i.e., 10 minutes).

Then, in step S210, the operating method of the realistic education media providing apparatus 200 according to an embodiment of the present disclosure reproduces the expert comparison-realistic education media content.

Accordingly, when the expert comparison-realistic education media content is reproduced, the display units A, B, C, and D, the sound output units A, B, and C, and the education device 150 may cause the trainee 2 to compare and experience respective techniques that both experts have demonstrated through the identical education device, by sequentially repeating an operation of reproducing a comparison time period in a unit of 10 minutes of the particular realistic education media content, and a corresponding time period in a unit of 10 minutes of the recommended realistic education media content; and an operation of again reproducing a next comparison time period in the unit of 10 minutes of the particular realistic education media content, and a next corresponding time period in the unit of 10 minutes of the recommended realistic education media content.

As described above, the realistic education media providing method according to an embodiment of the present disclosure provides a realistic education media content reproduction-based education environment which enables a trainee to receive a more realistic education by generating a new type of education content (i.e., realistic education media content) which enables the most realistic education on not only an image and a sound but also even the minute motion of an expert who is proficient in a high level of technique when the technique is performed by the expert, and by reproducing the realistic education media content.

Accordingly, the realistic education media providing method according to an embodiment of the present disclosure can overcome the limitations of an education using the existing education content, and can produce an effect such that the most realistic education can be performed on not only an image and a sound but also even the minute motion of an expert who is proficient in a high level of technique when the technique is performed by the expert.

Meanwhile, the steps of the methods, algorithms, or control functions described in connection with the embodiments disclosed herein may be implemented directly in hardware, or may be implemented in the form of program instructions executable by various computer means, and may be recorded in a computer-readable recording medium. The computer-readable recording medium may include program instructions, data files, data structures, and the like individually or a combination thereof. The program instructions recorded on the computer-readable recording medium may be specifically designed and configured for the present disclosure, or may be known to those skilled in the art of computer software to be useable. Examples of the computer-readable recording medium may include a magnetic medium, such as a hard disk, a floppy disk, and a magnetic tape; an optical recording medium, such as a Compact Disc Read-Only Memory (CD-ROM) and Digital Versatile Disc (DVD); a magneto-optical medium, such as a floptical disk; and a hardware device specially configured to store and execute program instructions, such as a Read-Only Memory (ROM), a Random Access Memory (RAM), a flash memory, and the like. Examples of the program instructions may include a machine language code created by a complier and a high-level language code executable by a computer using an interpreter and the like. The above-described hardware device may be configured to operate as one or more software modules so as to perform an operation of the present disclosure, and vice versa.

Although the present disclosure has been described in detail with reference to exemplary embodiments hereinabove, the present disclosure is not limited to the above-described exemplary embodiments, and the technical idea of the present disclosure will reach the range in which various changes in form and modifications can be made by any person having ordinary knowledge in the technical field to which the present disclosure pertains without departing from the subject matter of the present disclosure which is claimed in the following claims.

What is claimed is:

1. An apparatus for providing realistic education media, the apparatus comprising:
    an education device that a user operates and through which the user demonstrates an education on a technique;
    multiple video image-capturers configured to image-capture a predetermined space including the education device at different locations;
    at least one sound recorder configured to record a sound generated in the predetermined space;
    a movement recorder configured to record movement information of the education device according to the operation of the education device; and
    a generator configured to generate one piece of realistic education media content by using multiple pieces of video content which are image-captured by the multiple video image-capturers, respective pieces of sound content recorded by the at least one sound recorder, and the movement information recorded by the movement recorder,
    wherein the generator is configured to set video content setting information for each of the pieces of video content and use the video content setting information to generate the realistic education media content,
    wherein the video content setting information is set based on a result of analyzing at least one of a location of the user, exposure, and movement degrees of the education device in the video image in a case where the user operates the education device, and
    wherein the video content setting information includes at least one of a temporary stop time point during reproduction of video content, a retention time period of a temporary stop, and a reproduction time point after cancelling the temporary stop; and an enlargement time point of a particular area in a video image and an enlargement cancellation time point after an enlargement.

2. The apparatus as claimed in claim 1, further comprising:
    multiple display units to which the respective multiple pieces of video content are mapped, and configured to reproduce the pieces of video content mapped to the display units according to pieces of setting information, which are set for the pieces of video content; when the realistic education media content is reproduced;

at least one sound output unit to which the respective pieces of sound content are mapped, and configured to reproduce the pieces of sound content mapped to the at least one sound output unit according to pieces of setting information, which are set for the pieces of sound content, when the realistic education media content is reproduced; and an education device driver configured to drive the education device according to the movement information when the realistic education media content is reproduced.

3. The apparatus as claimed in claim 1, wherein the movement information comprises at least one degree-of-freedom value among an x position value, a y position value, a z position value, a roll torque value, a pitch torque value, and a yaw torque value of the education device which are expressed in three dimensions.

4. The apparatus as claimed in claim 1, wherein the generator is configured to set sound content setting information for each of the pieces of sound content and use the sound content setting information to generate the realistic education media content, wherein the sound content setting information is set based on a result of analyzing at leak one of whether a particular sound generated by movement of the education device is included, a volume of the particular sound, and whether a voice of the user is included, and wherein the sound content setting information includes at least one of a movement path of a sound output unit, a pattern of a movement speed of the sound output unit, and a sound volume adjustment value during the reproduction of the sound content.

5. The apparatus as claimed in claim 1, further comprising:

a content manager configured to manage realistic education media content generated for each user; and a recommender configured to recommend realistic education media content of another user who has operated an education device identical to an education device in a case of particular realistic education media content when reproduction of the particular realistic education media content is selected, wherein, when reproduction of the recommended realistic education media content is selected, the generator is configured to generate user comparison-realistic education media content by using the particular realistic education media content and the recommended realistic education media content.

6. The apparatus as claimed in claim 5, wherein the particular realistic education media content includes comparison time periods in a predetermined unit, wherein the recommended realistic education media content includes corresponding time periods respectively corresponding to the comparison time periods of the particular realistic education media content, and wherein the generator generates the user comparison-realistic education media content such that the comparison time period of the particular realistic education media content and the corresponding time period of the recommended realistic education media content are sequentially reproduced.

7. A method for providing realistic education media, the method comprising:

an image-capturing step of image-capturing a predetermined space including an education device, that a user operates and through which the user demonstrates an education on a technique, at different locations by multiple video image-capturers;

a recording step of recording a sound generated in the predetermined space by at least one sound recorder;

a movement recording step of recording movement information of the education device according to the operation of the education device by a movement recorder; and a content generation step of generating one piece of realistic education media content by using image-captured multiple pieces of video content, recorded pieces of sound content, and the recorded movement information, wherein the content generation step comprises: setting video content setting information for each of the pieces of video content and using the video content setting information to generate the realistic education media content, wherein the video content setting information is set based on a result of analyzing at least one of a location of the user, exposure, and movement degrees of the education device in the video image in a case where the user operates the education device, and wherein the video content setting information includes at least one of a temporary stop time point during reproduction of video content, a retention time period of a temporary stop, and a reproduction time point after cancelling the temporary stop; and an enlargement time point of a particular area in a video image and an enlargement cancellation time point after an enlargement.

8. The method as claimed in claim 7, further comprising:

reproducing, by the multiple display units to which the respective multiple pieces of video content are mapped, the pieces of video content mapped to the display units according to pieces of setting information, which are set for the pieces of video content, when the realistic education media content is reproduced;

reproducing, by the at least one sound output unit to which the respective pieces of sound content are mapped, the pieces of sound content mapped to the at least one sound output unit according to pieces of setting information, which are set for the pieces of sound content, when the realistic education media content is reproduced; and an education device driving step of driving the education device according to the movement information when the realistic education media content is reproduced.

9. The method as claimed in claim 7, wherein the movement information comprises at least one degree-of-freedom value among an x position value, a y position value, a z position value, a roll torque value, a pitch torque value, and a yaw torque value of the education device which are expressed in three dimensions.

10. The method as claimed in claim 7, wherein the content generation step comprises:

setting sound content setting information for each of the pieces of sound content and using the sound content setting information to generate the realistic education media content, wherein the sound content setting information is set based on a result of analyzing at least one of whether a particular sound generated by movement of the education device is included, a volume of the particular sound, and whether a voice of the user is included, and wherein the sound content setting information includes at least one of a movement path of a sound output unit, a pattern of a movement speed of the sound output unit, and a sound volume adjustment value during the reproduction of the sound content.

11. The method as claimed in claim 7, further comprising:
a content management step of managing realistic education media content generated for each user;
a recommendation step of recommending realistic education media content of another user who has operated an education device identical to an education device in a case of particular realistic education media content when reproduction of the particular realistic education media content is selected;
a comparison content generation step of generating user comparison-realistic education media content by using the particular realistic education media content and the recommended realistic education media content, when reproduction of the recommended realistic education media content is selected; and
a step of reproducing the user comparison-realistic education media content.

12. The method as claimed in claim 11, wherein the comparison content generation step comprises:
extracting corresponding time periods respectively corresponding to comparison time periods of the particular realistic education media content from the recommended realistic education media content; and
generating user comparison-realistic education media content configured such that the comparison time period of the particular realistic education media content and the corresponding time period of the recommended realistic education media content are sequentially reproduced.

* * * * *